United States Patent [19]
Krause

[11] Patent Number: 5,950,206
[45] Date of Patent: *Sep. 7, 1999

[54] METHOD AND APPARATUS FOR SEARCHING AND TRACKING CONSTRUCTION PROJECTS IN A DOCUMENT INFORMATION DATABASE

[76] Inventor: Gary Matthew Krause, 4483 Orion Rd., Rochester, Mich. 48306

[*] Notice: This patent issued on a continued prosecution application filed under 37 CFR 1.53(d), and is subject to the twenty year patent term provisions of 35 U.S.C. 154(a)(2).

[21] Appl. No.: 08/841,523

[22] Filed: Apr. 23, 1997

[51] Int. Cl.$^6$ ........................................ G06F 17/30
[52] U.S. Cl. .............................. 707/104; 707/5; 707/514; 364/282.1; 364/512
[58] Field of Search ...................... 707/104, 200, 707/5, 514; 705/1, 22; 364/282.1, 512; 379/112

[56] References Cited

U.S. PATENT DOCUMENTS

| | | | |
|---|---|---|---|
| 4,275,449 | 6/1981 | Aish | 364/512 |
| 4,370,707 | 1/1983 | Phillips et al. | 707/104 |
| 4,578,768 | 3/1986 | Racine | 364/528 |
| 4,642,780 | 2/1987 | Thomson | 364/512 |
| 4,700,318 | 10/1987 | Ockman | 345/431 |
| 4,782,448 | 11/1988 | Milstein | 705/400 |
| 4,875,162 | 10/1989 | Ferriter et al. | 705/29 |
| 4,885,694 | 12/1989 | Pray et al. | 705/400 |
| 4,964,060 | 10/1990 | Hartsog | 364/512 |
| 5,006,991 | 4/1991 | Ohcoshi et al. | 364/474.2 |
| 5,075,873 | 12/1991 | Seki et al. | 345/440 |

(List continued on next page.)

OTHER PUBLICATIONS

"Computers in Construction: Managing the Project," Middle East Computing, issue: 15, pp.: 14, 15 and 17, Aug. 1, 1984. Dodge DataLine$^{2TM}$ User Guide (Version 1.0) dated Mar. 1993.

The System 7 Book—"Getting The Most From Your New Macintosh Operating System"; Craig Danuloff—1st Edition; Copyright 1991.

New Home (May/Jun. 1990)—"The Great Outdoors—Ideas & Resources For Outdoor Living"; Elizabeth Stewart Lytle.

Electronic Design·Jul. 9, 1987—"Designers Build Smarts Into Their CAE Tools With Expert–System Shells"; Max Schindler.

Washington Home—"Landscaping By Computer" (Apr. 7, 1994—pp. 9–11); Lisa Braun–Kenigsberg.

"EXIST: an Interactive VLSI Architectural Environment" (Oct. 3–5, 1988); Pieter S. va der Meulen, Ming–Der Huang; Uzi Bar–Gadda, Eva Lee; Peter Baltus; Philips Research Laboratories Sunnyvale Signetics divsion of NAPC, MS 02.

*Primary Examiner*—Paul R. Lintz
*Assistant Examiner*—Ella Colbert
*Attorney, Agent, or Firm*—Howard & Howard

[57] ABSTRACT

A method and an apparatus for searching for and tracking construction projects includes a mass data storage device (12, 19, 26, 44) for storing as databases project information and document information related to construction projects. A member terminal (10) includes a computer (12) connected to an input device (16, 18, 20) and a display device (14). A user enters the databases using the input device (16, 18, 20) to mark at least one construction project identification for tracking based upon selection of at least one key word contained in the project information stored in the databases. The databases are periodically updated to reflect changes in the stored information and subsequent access to the databases causes the computer (12) to automatically display on the display device (14) each marked construction project for which the related information changed since the last time the user entered the databases. The databases can be stored on hard disk, CD–ROM or a remote server (40) for communicating via a telephone line (30) with the member terminal (10).

21 Claims, 6 Drawing Sheets

U.S. PATENT DOCUMENTS

| | | | |
|---|---|---|---|
| 5,091,869 | 2/1992 | Ingram et al. | 364/512 |
| 5,111,392 | 5/1992 | Malin | 705/29 |
| 5,189,606 | 2/1993 | Burns et al. | 705/10 |
| 5,249,120 | 9/1993 | Foley | 705/1 |
| 5,255,207 | 10/1993 | Cornwell | 364/512 |
| 5,297,249 | 3/1994 | Bernstein et al. | 345/356 |
| 5,299,307 | 3/1994 | Young | 345/339 |
| 5,319,541 | 6/1994 | Blanchard et al. | 705/29 |
| 5,341,469 | 8/1994 | Rossberg et al. | 707/514 |
| 5,404,518 | 4/1995 | Gilbertson et al. | 707/3 |
| 5,414,843 | 5/1995 | Nakamura et al. | 707/104 |
| 5,444,844 | 8/1995 | Inoue et al. | 345/326 |
| 5,526,520 | 6/1996 | Krause | 707/104 |
| 5,555,505 | 9/1996 | Oosawa et al. | 364/470.07 |
| 5,558,736 | 9/1996 | Douglas et al. | 364/512 |
| 5,570,291 | 10/1996 | Dudle et al. | 364/468.01 |
| 5,625,827 | 4/1997 | Krause et al. | 707/502 |
| 5,689,705 | 11/1997 | Fino et al. | 707/201 |
| 5,761,674 | 6/1998 | Ito | 707/104 |

ELECTRONIC PLANROOM
*Project Information Record*

---

DUE DATE:
PLANROOM CODE: MI-SE   ETICODE: A11MW   STATUS: RE   ON FILE

PROJECT:       Re-bid New First Union Baptist Church - Design xxx
OWNER:         First Union Baptist church
ARCHITECT:     Seidel, Gaskey. Olds & Howard pc.

PLAN INFO:     Not on file

EST. COST:     $ 109.854.71
BID SECURITY:
DESC:
Work includes - xxxxx xx x   xx xxxxx x   xxxxxx xx x   x xx   xxxx xx x   xx xxxxx x   xxxxxx xx x   x xx
xxxx xx x   xx xxxxx x   xxxxxx xx x   x xx   xxxx xx x   xx xxxxx x   xxxxxx xx x   x xx
NOTES:
This project is currently being—xx  xxx xxxxx x  xxxxxx xx   xxxxx xxx x xx  xxxxxx x

PREV. PUBL. DATES:   12-12-97  6-5-96

PROJ. REPORTER:      William Williams (248) 717-80xx

BIDDERS:
FIRST REPORT:   12-12-97
USER NOTES:

PROJECT REPORT   2-13-98   14:10:06

A-96-2073   (NP) (PSB)   (CD A1LLG  v 2 i 52)   Birmingxxxx

OWNER:   Birmingham Public Schools, Purchasing Dept.

DUE AT:   Owner
Thursday, July 18, 1998

ARCH. :   Seidel, Gaskey. Olds & Howard

PLAN INFO:   ON FILE

EST. COST:   $75,000

BID SECURITY:   5% Bid bond cert xxxxx

NOTES:
For further information conxxxx xxxx xxxxx xx  xxxxx xxxxx xx   x  xxxxxx

PRV. DATE:   7-12-98

REPORTER:   William Williams (248) 316-12xx

FIRST REPORT:   7-11-98
Project will enxxxx xxxxxx  xxxxxx xx  xxxxxx x xxxxx    xxxx xxxxxx xxxxxx xx xxxxxx x xxxxxx
xxxx xxxxxx xxxxxx xx xxxxxx x xxxxx    xxxx xxxxxx xxxxxx xx xxxxxx x xxxxx
SPECIFICATIONS INCLUDE THE FOLLOWING CSI CODES (GROUPED BY 100s)
01000   06300   16000   16100   16400   16500   16900

```
CHANGED TRACKED PROJECTS    9-2-98  14:13:40

3 JOBS

A95 - 0714
 MILAN SATELLITE CAMP - PROJECT # x4P - sol - 6
OWNER:
 Federal Correctional Facility DUE AT: Owner
 Thursday, July 14, 1998  -  11A.M. xxxx xx xxxxx x xxxxxxxxx xxx
------------------------------------------------
A96-1960      (AB) (PSBA)  (CD A!IGG)
 Royal Oak Golf Course, Club House Addition
OWNER:
 City of Royal Oak DUE AT: Owner
 Wednesday, April 30, 1997  -  11:00 AM (Public Open)
------------------------------------------------
A96-2022    (DE) (PSB) (CD A1KG    v  2  i  50) Ferndale
 Coolidge Middle School    Bid pack 3   Various Trades
OWNER:
 Ferndale School District  123 Pinecrest  xxx  (xxx) xxx xxxx DUE AT: Owner
 Monday, May 15, 1997    3:PM  (Publ. Open )
------------------------------------------------
```

METHOD AND APPARATUS FOR SEARCHING AND TRACKING CONSTRUCTION PROJECTS IN A DOCUMENT INFORMATION DATABASE

BACKGROUND OF THE INVENTION

The present invention relates generally to a computer based system and method for processing and organizing building construction documents and, in particular, to an apparatus and method for searching, tracking and organizing building projects.

It is common in the building construction industry that architects or other design personnel draw up construction blueprints or plans either by hand or on a computer aided design (CAD) system. Such blueprints or working drawings include a general or primary plan drawing with supporting pages of detailed, secondary drawings supplementing and referencing the primary building drawing, i.e., floor plans, sectional views, etc., along with supporting textual specifications. The detailed drawings provide more specific information for various portions or areas of the primary plan drawing. In most areas, for bidding purposes, a single company distributes rolls of microfiche of the blueprint drawings or building plans in their entirety to interested contractors and subcontractors. Selected ones of the drawings on the microfiche are then viewed to provide information to estimate construction costs and prepare bid proposals on the work to be done. Though a contractor may be interested in only one particular portion of the building, that contractor must search through all of the plans in order locate the drawings of interest. Obviously, this type of system is inefficient and time consuming for each bidder.

It has been known in the art to input information into a computer for cost estimating analysis and reporting. Common computer systems may provide costs of material and provide reports thereof based on construction information specifically put into the computer. An example of such capability is illustrated in U.S. Pat. No. 5,189,606.

The U.S. Pat. No. 4,885,694 shows an automated building control design system. The system is computer based for substantially automating the designs of a building control system, such as pneumatic, electronic, environmental, energy management, automation, fire and security, and combinations thereof.

The U.S. Pat. No. 4,964,060 shows a building plan checking system which reviews building plans in view of required standards, such as zoning codes and regulations.

The U.S. Pat. No. 5,091,869 shows a building floor plan creating system which converts measurement data into a floor plan view.

The U.S. Pat. No. 5,111,392 shows a system for creating furniture layouts which utilizes standard furniture pieces. The finish, color and fabric can be separately determined for the furniture layout and pieces. Cost and bill of materials can be automatically produced based on the designed layout.

The U.S. Pat. No. 5,189,606 shows an integrated system for construction cost estimating, analysis and reporting of military projects based upon input parameters indicative of the type, size and location of the facility.

The U.S. Pat. No. 5,249,120 shows an automated manufacturing cost estimating system based upon the initial material and the operations to be performed.

The U.S. Pat. No. 5,255,207 shows a method for designing and detailing cabinets which allow a user to design cabinet structure by standard cabinet designs and to modify or override standard designs as desired. The program also allows the cost of the materials of the cabinets to be produced based on the design.

The U.S. Pat. No. 5,299,307 shows a method of drawing images by manipulating objects as to their size, dimension, location and positioning on the computer display.

The U.S. Pat. No. 5,319,541 shows a computer for aiding in the selection of roofing systems and generating the specifications therefor. The roofing system is selected from various design data entered by the user and the specifications are generated by applying the user entered design data to modify standard specifications.

The U.S. Pat. No. 5,526,520 shows a method for organizing and relating several documents, including graphic documents, by storing the documents in a plurality of files and identifying specific ones of the files with a particular project. The documents can be a primary document, such as a general view blueprint, and secondary documents, such as detailed drawings, textual and function files. The files are linked to one another by placing hotspots on the primary document to automatically call up the corresponding secondary document.

The prior art fails to show a system for identifying and tracking construction projects of interest to potential bidders.

SUMMARY OF THE INVENTION

The present invention concerns an apparatus for searching for and tracking construction projects. The apparatus includes a mass data storage means having stored therein a project information database of project information related to each of a plurality of construction projects, the project information containing a plurality of key words associated with at least one of a type of work to be done and a type of building material to be used; and a member terminal means including a computer means connected to the mass data storage means, an input means connected to the computer means for accessing the project information database and a display means connected to the computer means whereby a user can actuate the input means to mark at least one of the construction projects for tracking by selecting at least one key word contained in related project information stored in the mass data storage means and, upon subsequently accessing the mass data storage means, the computer means automatically displays on the display means each of the marked construction projects for which the related project information changed since the last time the mass data storage means was accessed by the user. The apparatus also includes a document information database stored on the mass data storage means, the document information database including construction document information in the form of at least one of a project description, blueprint plans, specifications, addenda, bid forms, contracts and miscellaneous information related to the construction projects in the project information database whereby the computer means responds to a user input at the input means and displays on the display means the construction document information related to each of the marked construction projects. When the mass data storage means is a remote computer database, the apparatus includes a server means connected to the computer database, a main terminal connected to the server means for periodically updating the project information and the document information stored in the computer database to reflect changes in such information, a main modem means connected to the server means for communicating via a telephone line, and a member modem means connected to the member terminal means for communicating with the telephone line whereby when the member modem means and the main modem means are connected to the telephone line, a user can selectively connect the computer database to the computer means.

The present invention also concerns a method of searching for and tracking construction projects including the steps of: a. storing the project information database of project information related to each of a plurality of construction projects, the project information containing a plurality of key words associated with at least one of a type of work to be done and a type of building material to be used; b. selecting at least one of the key words as a search parameter; c. accessing the project information database, searching the project information in the project information database for the key word, and displaying an identification of each construction project having related information containing the key word; d. marking at least one displayed construction project identification for tracking and exiting the database; e. updating the project information stored in the project information database periodically to reflect changes in the project information; and f. accessing the project information database after the step e. is performed and automatically displaying each marked construction project for which the related project information changed since the last time the project information database was accessed. The method further includes the steps of storing the document information database including construction document information in the form of at least one of a project description, blueprint plans, specifications, addenda, bid forms, contracts and miscellaneous information related to the construction projects in the project information database, accessing the document information database and displaying the construction document information related to each of the marked construction projects.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
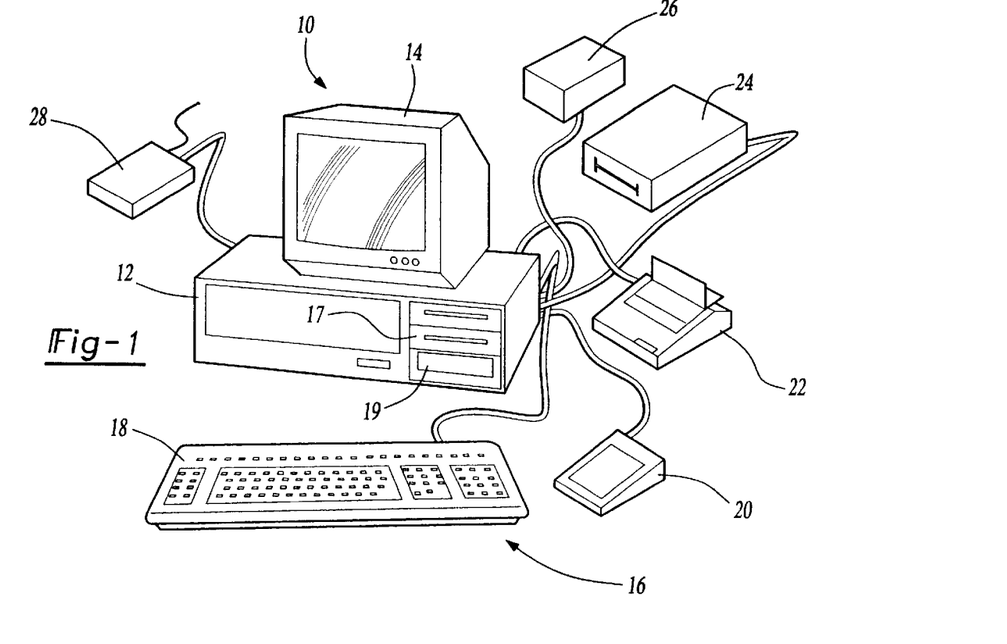
FIG. 1 is a schematic diagram of a member terminal used in the construction project electronic planroom system according to the present invention.

A member terminal 10 used in a construction project electronic planroom system according to the present invention is illustrated in the FIG. 1. The terminal 10 includes a computer means 12 connected to a display means 14 and to an input means 16. The display means 14 generally comprises a CRT monitor as commonly known in the art. The input means 16 comprises one or more input devices such as a floppy disk drive 17, a standard computer keyboard 18, a mass data storage drive 19 and a remote control mouse 20, each connected to or mounted in the computer means 12 as known in the art. The mass data storage drive 19 can be a CD-ROM drive or a "zip" drive available from Iomega Corporation of Roy, Utah. The input means 16 allows for input of information and selection of functions as subsequently discussed. The computer means 12 must include a model 486DX 66 MHz or better microprocessor (CPU), at least 8 MB of RAM, a Microsoft Windows v3.1 or better (in enhanced mode) operating system, WinVantage 2000 communications software and Intelliprints take off software. The WinVantage and Intelliprints software packages are available from Essential Technology, Inc. of Rochester, Mich. The display means 14 should be a 17" color video monitor for blueprint viewing and the computer means 12 should include a 2 MB video card supporting 1280×1024 resolution. Also, the computer means 12 should include a hard disk for storing the above-identified operating system and software packages.

The member terminal 10 also includes auxiliary components which can be attached in typical computer fashion. Such auxiliary components include an output means 22 which can be an output device such as a printer/plotter, an information input device 24 such as a scanner, and a mass data storage device 26 such as a CD-ROM drive or a hard disk drive. The auxiliary components also include a communication means 28, typically a modem or other communication device, for communicating with a remote database. The member modem 28 should operate at 28.8 Kbaud or higher.

Figure 2:
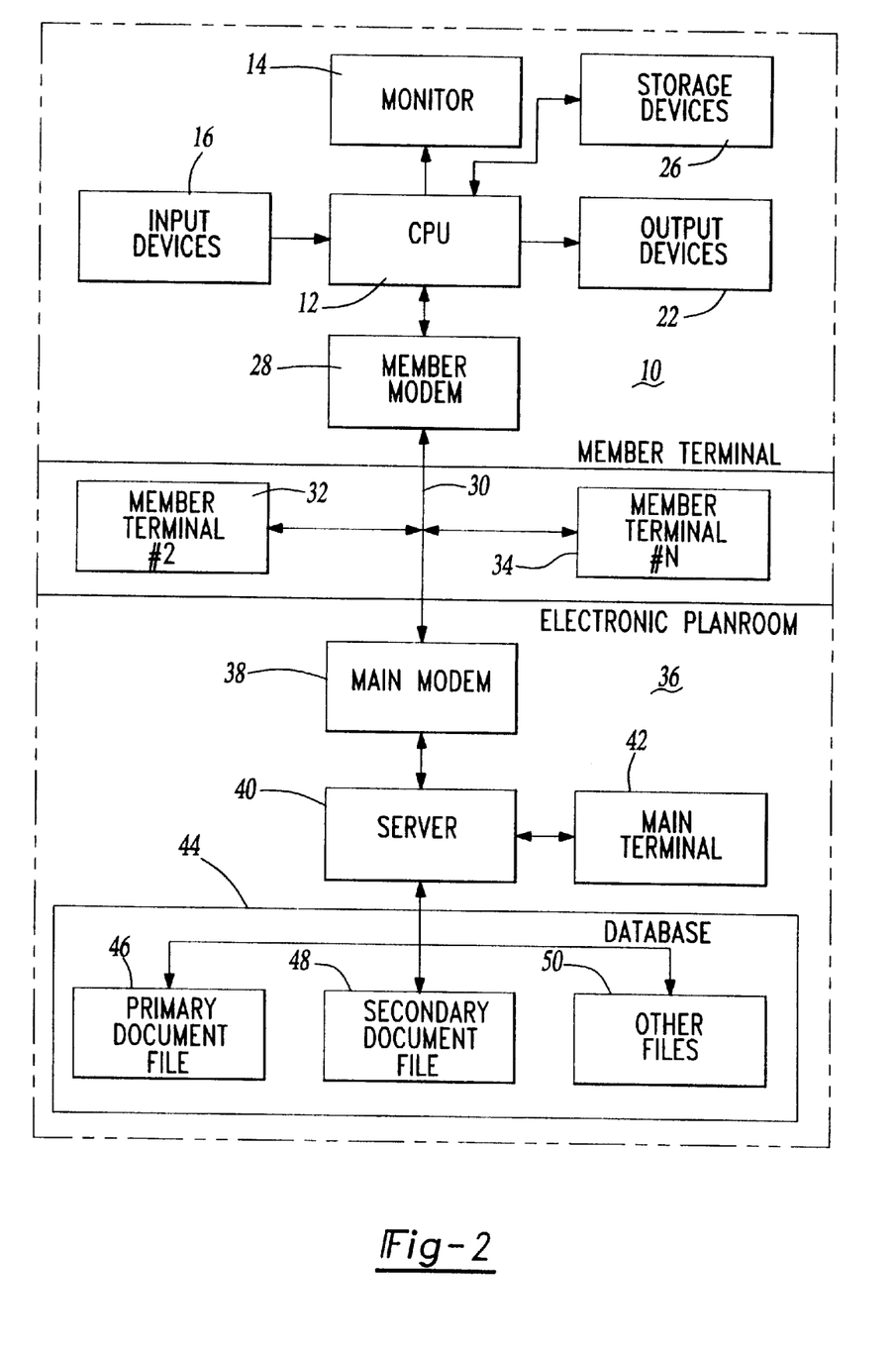
FIG. 2 is a block diagram of the system according to the present invention including the member terminal shown in the FIG. 1.

There is shown in the FIG. 2 a construction project electronic planroom system according to the present invention including the member terminal 10 connected to a telephone line 30 through the member modem 28. Additional member terminals also can be connected to the telephone line 30 such as a member terminal #2 32 through a member terminal #N 34 representing the maximum number of member terminals which can be connected to a remote electronic planroom 36 at one time. The planroom 36 includes a main modem 38 connected between the telephone line 30 and a server 40. A main terminal 42 is connected to the server 40 for inputting construction project information related to new projects and to updates to currently stored projects. The server 40 also is connected to a computer database means 44 in which the project information is stored. The database 44 is a memory means which includes a primary document file 46, a secondary document file 48 and other files 50. The main terminal 42 and the storing of the construction project information in the database 44 is explained in more detail in the U.S. Pat. No. 5,526,520, issued Jun. 11, 1996 and incorporated herein by reference.

The starting point for searching for construction projects of interest is the project description portion of the information stored in the database 44. The project description includes important information such as name, location, due date, general work to be done. Other types of information available can include blueprint plans, specifications, addenda, bid forms, contracts and miscellaneous.

Figure 4:
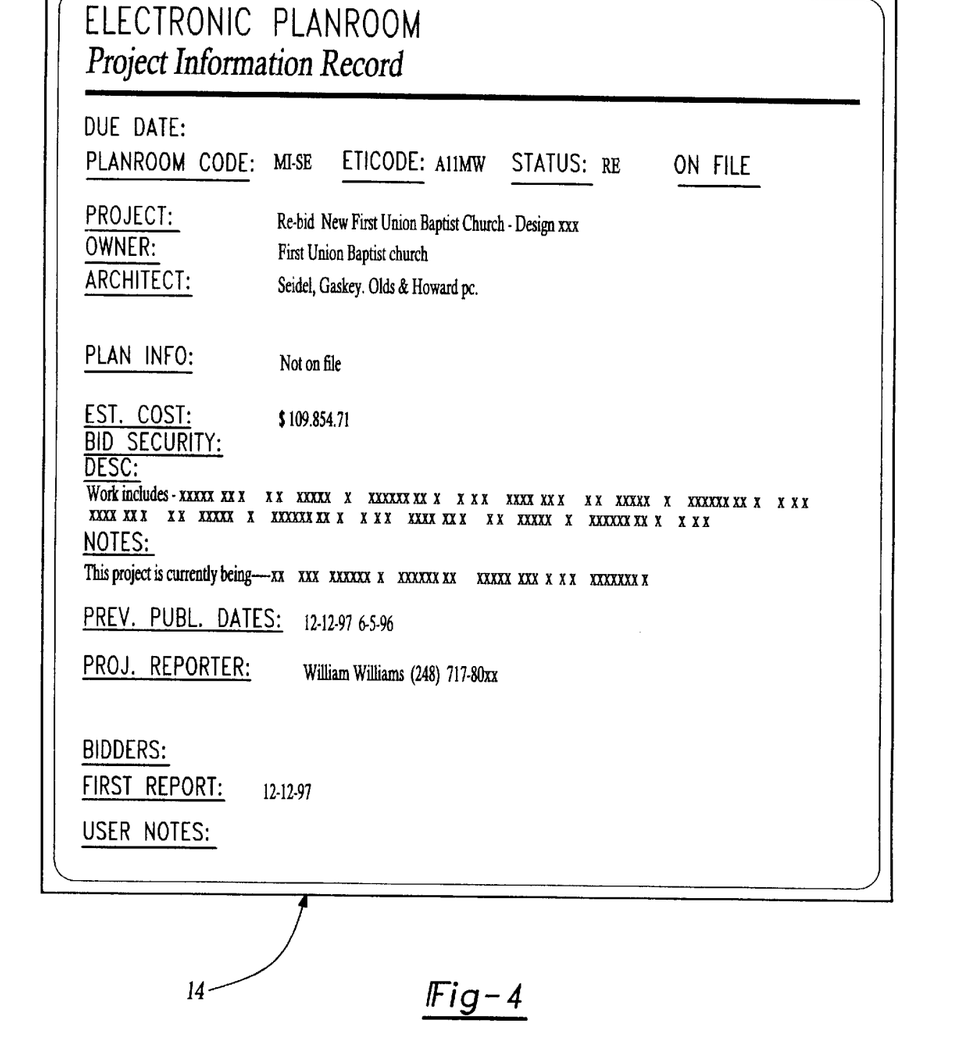
FIG. 4 is a project information report generated by the system shown in the FIG. 2.
Figure 5:
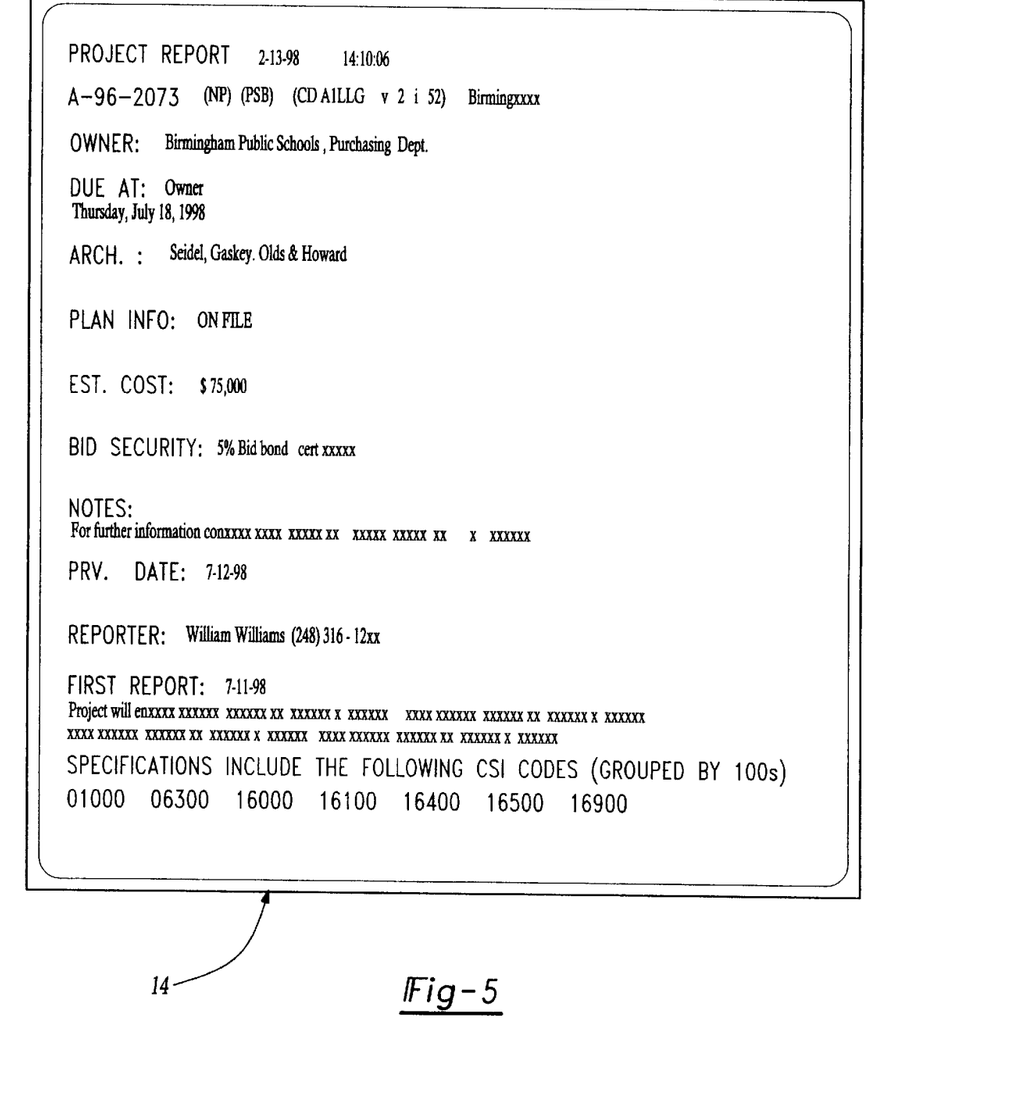
FIG. 5 is another project information report generated by the system shown in the FIG. 2.

A person interested in bidding on construction projects receives a member ID and a password which enable communication between the member terminal 10 and the electronic planroom 36. A method of operation according to the present invention is shown in the FIG. 3. The member connects to the planroom 36 and enters the member ID and password in an instruction set 52 to receive authorization to enter the database 44. Once authorized, the member can use the input devices 16 to select one or more key words in an instruction set 54. The key words relate to the type of project in order to limit the information viewed to projects of interest to the member. For example, the member may only be interested in bidding on labor and/or material related to masonry. By selecting "masonry" as a key word, only projects having "masonry" in the stored information will be displayed on the monitor 14 when the database 44 is searched. An example of a project description including the key word "masonry" is shown in the FIG. 4 which is a project information report that can be printed by the member. The key words available also include CSI numbers. An example of a project description including CSI numbers as key words is shown in the FIG. 5 which is another project information report that can be printed by the member.

Figure 3:
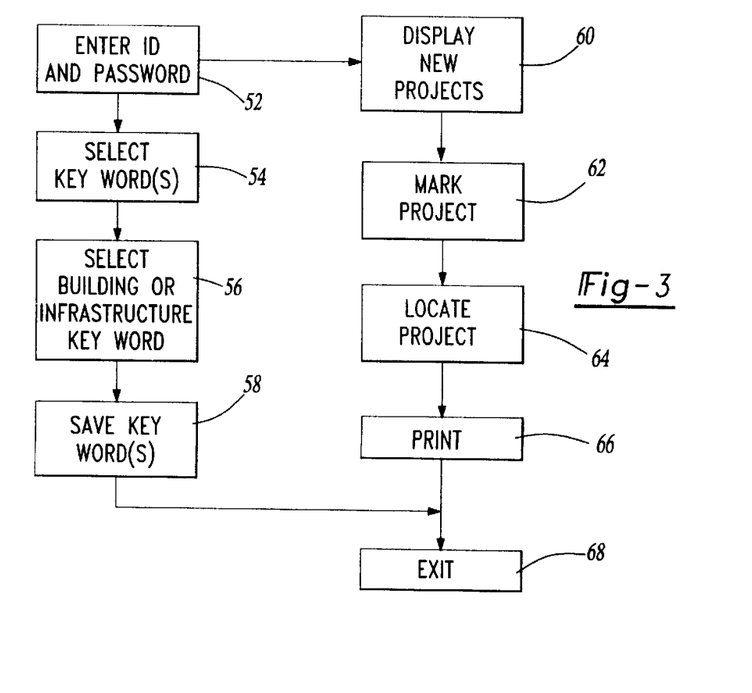
FIG. 3 is a flow chart of the method of operating the system shown in the FIG. 2.

One of the two basic key words "building" and "infrastructure" that apply to all projects must be selected in an instruction set 56 even though the member has selected one or more other key words. The key words are then saved in an instruction set 58 for use during subsequent searches.

Figure 6:
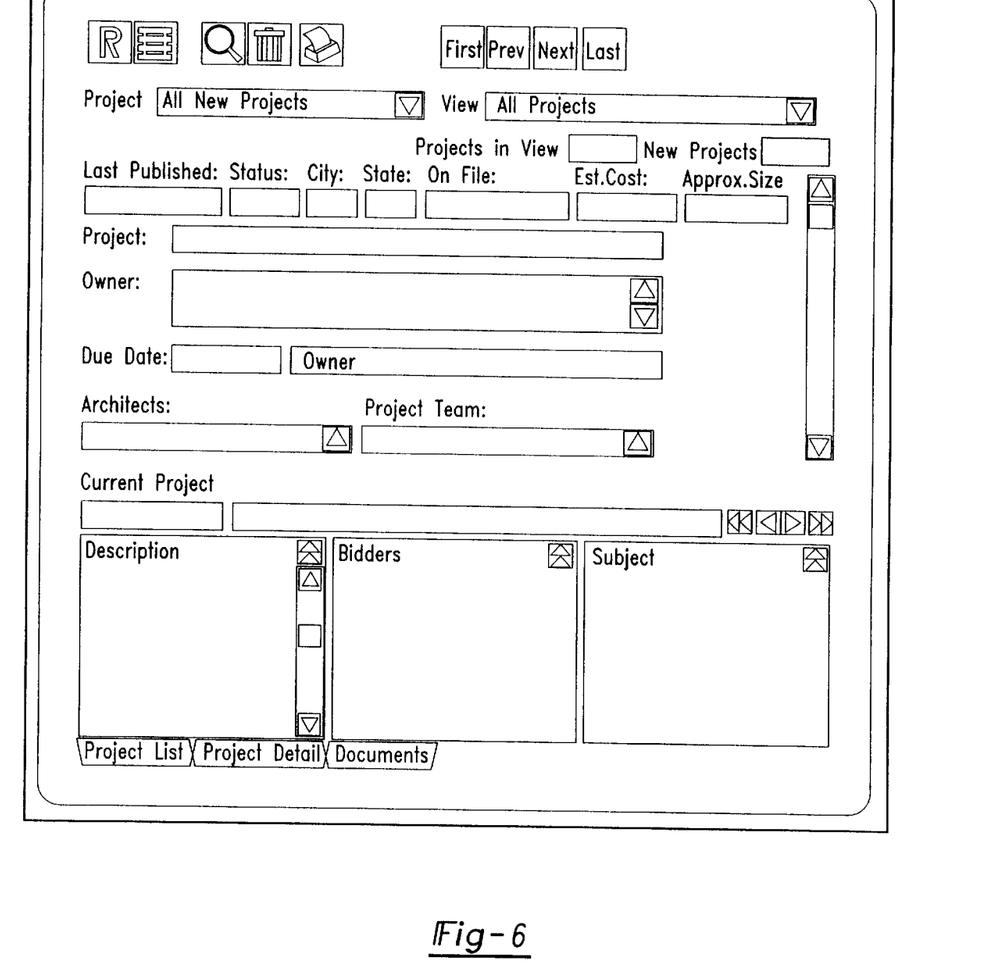
FIG. 6 is a list of all new projects generated by the system shown in the FIG. 2.

The member searches for projects of interest by branching from the instruction set 52 to an instruction set 60 wherein new projects are displayed. When a project arrives at the electronic plan room 36 for the first time, it is assigned an arrival date called the "New Project Date". The last date that the member entered the planroom is stored and any project having a New Project Date subsequent to the last entry date and including the member's key words can be displayed to the member automatically on the monitor 14. The member can print on the printer 22 any of several reports based upon the new projects located. An example of a list of all new projects is shown in the FIG. 6.

Figure 7:
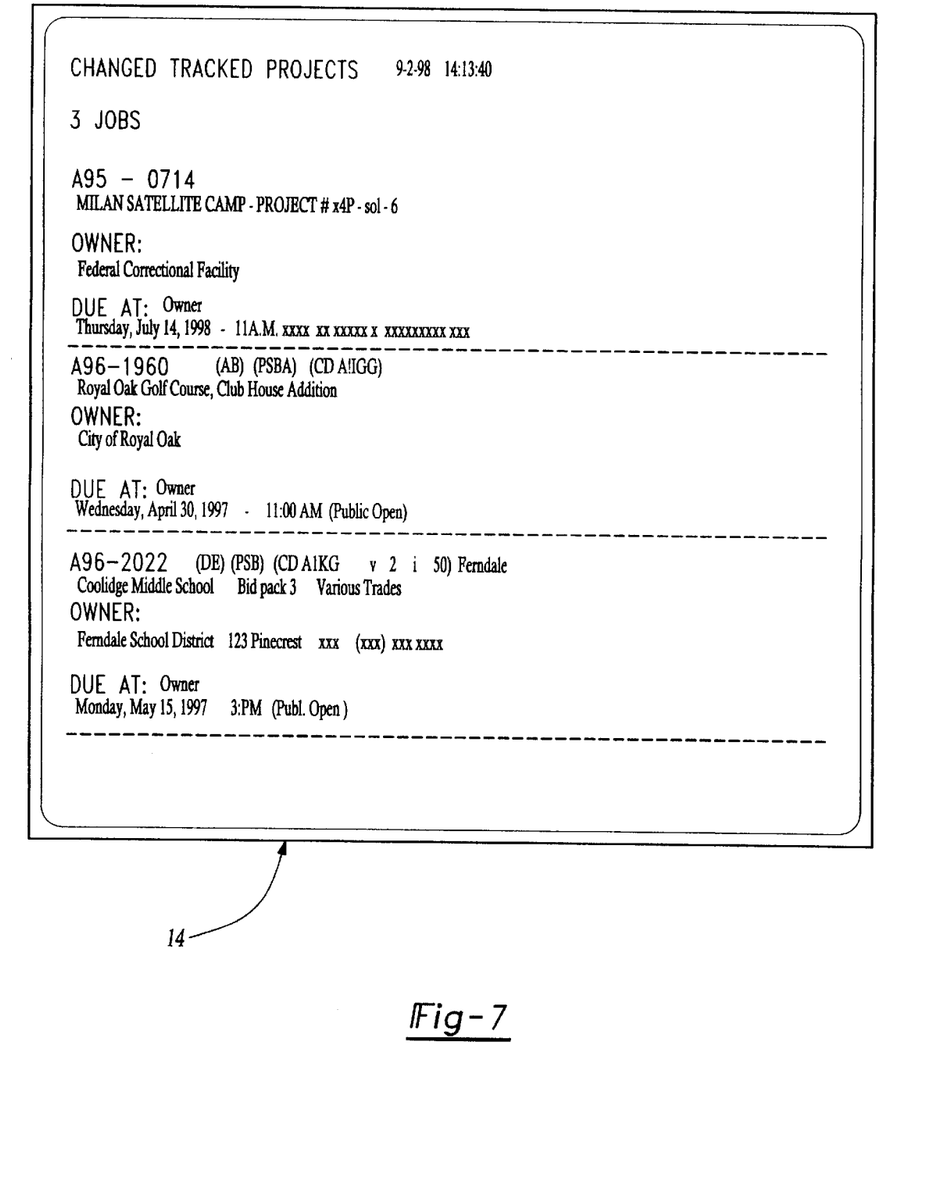
FIG. 7 is a changed tracked projects report which is generated by the system shown in the FIG. 2.

Next, the member can mark any new project found by the key word search for tracking in an instruction set 62. By marking a project, the system automatically alerts the member of a change in the information related to the project when that change is recorded in the database 44. The instruction set 62 also permits the member to remove the mark from the project to discontinue the tracking. There is shown in the FIG. 7 a list of changed tracked projects generated by the system.

Any construction project in the database 44, whether or not it contains one of the selected key words, can be located using the instruction set 64. The member can search the database using sort words such as the project "due date" or the project "name".

The member also can print any of the information related to the project in an instruction set 66. As stated above, construction document information in the form of a project description, blueprint plans, specifications, addenda, bid forms, contracts and miscellaneous information is available for viewing and printing at the member terminal 10. Finally, the member exits from the electronic planroom from the instruction sets 58 and 66 at an instruction set 68.

The member also can search projects and track marked projects off line by receiving a CD-ROM containing the project information stored in the computer database means 44. The CD-ROM is inserted into the data storage device 26 and the member proceeds through the steps 60, 62, 64 and 66 shown in the FIG. 3.

The present invention links a project information database with a construction document information database to enable a user to identify and track construction projects of interest to potential bidders. Each database can be located in the same or a separate one of several storage devices accessible through the member terminal 10. These storage devices include a hard disk drive internal to the computer means 12, a mass storage device 19 such as a CD-ROM drive or "zip" drive, an external data storage device 26 such as a CD-ROM drive or a hard disk drive, and an on-line computer database 44.

The invention concern an apparatus for searching for and tracking construction projects including: the mass data storage means 12, 19, 26, 44 having stored therein a project information database of project information related to each of a plurality of construction projects, the project information containing a plurality of key words associated with at least one of a type of work to be done and a type of building material to be used; and the member terminal means 10 including the computer means 12 connected to the mass data storage means 12, 19, 26, 44, the input means 16, 18, 20 connected to the computer means for accessing the project information database and the display means 14 connected to the computer means whereby a user can actuate the input means to mark at least one of the construction projects for tracking by selecting at least one key word contained in related project information stored in the mass data storage means and, upon subsequently accessing the mass data storage means, the computer means automatically displays on the display means each of the marked construction projects for which the related project information changed since the last time the mass data storage means was accessed by the user. The apparatus also includes a document information database stored on the mass data storage means 12, 19, 26, 44, the document information database including construction document information in the form of at least one of a project description, blueprint plans, specifications, addenda, bid forms, contracts and miscellaneous information related to the construction projects in the project information database whereby the computer means 12 responds to a user input at the input means 16, 18, 20 and displays on the display means 14 the construction document information related to each of the marked construction projects. When the mass data storage means is the computer database 44, the apparatus includes the server means 40 connected to the computer database, the main terminal 42 connected to the server means for periodically updating the project information and the document information stored in the computer database to reflect changes in such information, the main modem means 38 connected to the server means for communicating via the telephone line 30, and the member modem means 28 connected to the member terminal means 10 for communicating with the telephone line whereby when the member modem means and the main modem means are connected to the telephone line, a user can selectively connect the computer database to the computer means 12.

The present invention also concerns a method of searching for and tracking construction projects including the steps of: a. storing the project information database of project information related to each of a plurality of construction projects, the project information containing a plurality of key words associated with at least one of a type of work to be done and a type of building material to be used; b. selecting at least one of the key words as a search parameter; c. accessing the project information database, searching the project information in the project information database for the key word, and displaying an identification of each construction project having related information containing the key word; d. marking at least one displayed construction project identification for tracking and exiting the database; e.

updating the project information stored in the project information database periodically to reflect changes in the project information; and f. accessing the project information database after the step e. is performed and automatically displaying each marked construction project for which the related project information changed since the last time the project information database was accessed. The method further includes the steps of storing the document information database including construction document information in the form of at least one of a project description, blueprint plans, specifications, addenda, bid forms, contracts and miscellaneous information related to the construction projects in the project information database, accessing the document information database and displaying the construction document information related to each of the marked construction projects.

The invention has been described in an illustrative manner, and it is to be understood that the terminology which has been used is intended to be in the nature of words of description rather than of limitation.

Obviously, many modifications and variations of the present invention are possible in light of the above teachings. In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A system for searching for and tracking construction projects comprising:

a mass data storage having a project information database of project information related to each of a plurality of construction projects, the project information containing a plurality of key words associated with at least one of a type of work to be done and a type of building material to be used;

a document information database having construction document information in the form of at least one of a project description, blueprint plans, specifications, addenda, bid forms, contracts and miscellaneous information related to the construction projects in the project information database;

a member terminal including;

a computer connected to said mass data storage;

an input device connected to said computer that allows a user of the system to access the project information database and said document information database;

a display connected to said computer;

said input device permitting a user to mark at least one of the construction projects for tracking by selecting at least one key word contained in related project information stored in said mass data storage and upon subsequently accessing said mass data storage, said computer automatically displays on said display each of the marked construction projects for which the related project information changed since the last time said mass data storage was accessed by the user; and wherein said computer responds to a user input at said input and displays on said display the construction document information related to each of the marked construction projects and the user can manipulate the displayed construction document information without altering the construction document information from said database.

2. The system according to claim 1, wherein the document information database includes a primary document file for storing primary documents related to a construction project, a secondary document file for storing secondary documents related to the primary documents and other files for storing other information related to the construction project.

3. The system according to claim 1, wherein said project information database is stored in a CD-ROM drive of said mass data storage and said document information database is stored in a computer database of said mass data storage, said computer being connected to said computer database by a telephone line and modems.

4. The system according to claim 3, including at least another member terminal for connection to the telephone line for communication with said computer database while said member terminal is communicating with said computer database.

5. The system according to claim 1, wherein said computer responds to a user input at said input device and automatically calculates a measurement related to a selected portion of one of the construction documents displayed on said display means.

6. The system of claim 1, wherein said computer responds to an input from said input device and automatically moves from a first one of the construction documents to a second one of the construction documents having a display that corresponds to information on the first document and displays the second document on said display.

7. The system of claim 1, wherein said computer updates said document information database such that each time a user manipulates the document information a resulting calculation is stored and subsequently automatically provided to the user.

8. The system according to claim 1, wherein said mass data storage is a computer database and including a server connected to said computer database, a main terminal connected to said server for periodically updating the project information and the document information stored in said computer database to reflect changes in such information, a main modem connected to said server for communicating via a communication link, and a member modem connected to said member terminal for communicating with the link whereby when said member modem and said main modem are connected to the link, a user can selectively connect said computer database to said computer.

9. A method of searching for and tracking construction projects and manipulating information regarding the projects including the steps of:

(A) storing a project information database of project information related to a plurality of construction projects, the project information containing a plurality of key words associated with at least one of a type of work to be done and a type of building material to be used and a plurality of construction documents associated with each project;

(B) selecting at least one of the key words as a search parameter;

(C) accessing the project information database, searching the project information in the project information database for the key word, and displaying an identification of each construction project having related information containing the key word;

(D) selectively displaying at least one of the construction documents of at least a selected one of the projects from step (C);

(E) manipulating the displayed document to generate additional document information without altering the displayed document;

(F) marking at least one construction project from step (C) for tracking;

(G) updating the project information stored in the project information database periodically to reflect changes in the project information; and (H) accessing the project information database after step (G) is performed and automatically displaying each marked construction project for which the related project information changed since the last time the project information database was accessed.

10. The method according to claim 9, wherein the stored project information includes sort words and step (C) includes locating construction projects of interest by searching for selected ones of the sort words.

11. The method according to claim 9, including performing steps (A) and (G) on a main computer database and performing steps (C), (F), and (H) remotely from the main computer database.

12. The method according to claim 9, including performing steps (A) and (G) by storing the project information on a CD-ROM and performing steps (B) through (F) and (H) on the project information stored on the CD-ROM.

13. The method according to claim 9, including printing the project information related to selected ones of the construction projects displayed in steps (C) and printing the additional document information from step (E).

14. The method according to claim 9, wherein step (A) includes storing a document information database including construction document information in the form of at least one of a project description, blueprint plans, specifications, addenda, bid forms, contracts and miscellaneous information related to the construction projects in the project information database.

15. The method of claim 9, wherein step (E) includes calculating a measurement related to a selected portion of the displayed construction project.

16. The method of claim 9, wherein step (E) includes choosing a portion of a first displayed document and automatically displaying a second document containing information corresponding to the chosen portion of the first document.

17. The method of claim 9, further comprising updating the construction document information to include the additional document information generated in step (E).

18. The method of claim 17, wherein step (H) includes automatically including a display of the updated document information.

19. The method of claim 9, wherein step (A) includes storing the construction documents by scanning in blueprint drawings.

20. The method of claim 14, wherein step (A) includes scanning in the blueprint plans.

21. The system of claim 1, wherein the blueprint plans that are stored in the document information database are scanned in blueprint drawings.

\* \* \* \* \*